UNITED STATES PATENT OFFICE.

SIGMUND FRAENKEL AND EDMUND HERRMANN, OF VIENNA, AUSTRIA, ASSIGNORS TO SOCIETY OF CHEMICAL INDUSTRY IN BASLE, OF BASEL, SWITZERLAND.

HORMONES AND PHOSPHATIDES AND PROCESS OF OBTAINING SAME.

1,314,321. Specification of Letters Patent. Patented Aug. 26, 1919.

No Drawing. Application filed July 30, 1914. Serial No. 854,200.

*To all whom it may concern:*

Be it known that we, SIGMUND FRAENKEL, a subject of the Emperor of Austria, and EDMUND HERRMANN, a subject of the Emperor of Austria, both residing at Vienna, Austria, have discovered certain new and useful Hormones and Phosphatides and Processes of Obtaining Same, of which the following is a specification.

The product of our process is a substance, which distils in a vacuum of 0.06 mm. mercury, at a bath temperature of 240° C. and an inner temperature of 193° C. (uncorrected). At ordinary atmospheric temperature it is a light thickly-flowing oil and shows the typical reactions of cholestol. It contains only the elements: carbon, hydrogen and oxygen. By combustion analyses, the content of carbon was found to be 81.33 to 81.62% and that of hydrogen was 11.32 to 11.49%.

The physiological effects of the new substances consist in the promotion of the growth of the uterus, of the ovaries, of the oviducts, of the vagina, of the mamma, and in the increase of the secretion of the mammary glands. The substances produce in the case of half-grown-up animals premature sexual maturity and hinder their development along other lines, furthermore they produce rutting symptoms out of the rutting season.

The substances appear therefore suitable for the treatment of all disorders produced by the failure of the ovarian functions.

In the manufacture of hormones, new substances containing nitrogen are also isolated, recognized as pentaminodiphosphatides. These phosphatides are very easily soluble in ether, petroleumether as well as in alcohol, while they are sparingly soluble in acetone. Therefore they can be precipitated from a concentrated solution in the said solvents by acetone. In water they are soluble in the manner of colloids. They give the reaction of unsaturated compounds with permanganate; nitrogen and phosphorus are contained therein in the approximate proportion of 5.2. In the vacuum the substance can be turned into a solid of wax-like consistency easily powdered in a mortar. Being heated it is completely decomposed at a temperature of 240°–250°.

The hormones themselves are not soluble in water, but they are taken up by the colloidal-watery solution of the phosphatides. Owing to the presence of phosphatides they exist in this form in the tissue, from which they can according to the present invention be obtained, by first dissolving the hormones as well as the phosphatides by means of volatile solvents, and by then precipitating the phosphatides and finally by isolating the hormones from the mother liquid by freeing them from the admixed fats, saturated esters of cholestol and cholestol itself.

There are several ways for producing the solution of hormones and phosphatides in volatile solvents.

First the tissue can be extracted with slightly acidulated boiling water and from the concentrated extract the second extract may be obtained with volatile solvents. The minced tissues can besides be immediately extracted with volatile solvents. Finally the tissue can be dried, before the extraction with volatile solvents, and that is the most advantageous method. For this purpose it is either dried in the vacuum or mixed with anhydrous salts as sodium sulfate or phosphate.

The dried tissue can then be worked up by either one of two different methods. The one method consists in extracting from the tissue the colloidal solution of the phosphatides containing the hormones by a volatile solvent capable of dissolving water, such as for instance, acetone or alcohol. If the solvent is then distilled, a comparatively concentrated aqueous solution of the required substances remains, from which (by means of solvents which are not miscible with water) the latter can be shaken out. Suitable solvents are for instance petroleum ether and ether. A solution, in the volatile solvent, containing both the nitrogen-containing phosphatides and the hormones, and also some other substances, is thereby obtained.

Instead of drying the starting materials *in vacuo*, or drying them by grinding with anhydrous salts, they can be freed from most of their water by treatment with the water-dissolving solvent which is used for extracting the colloidal solution of the hormones from the tissue, such as for instance acetone. In this case, the first acetone solution is brought together with the principal solution for the concentration and further treatment.

Instead of the above mentioned procedure, the extraction with water-dissolving volatile solvents following the drying or dehydration of the tissue can be omitted and the carefully dried tissue, or the tissue dehydrated by means of salts or water-dissolving solvents, can be directly extracted with a solvent not miscible with water, such as petroleumether or ether.

From the solution in the volatile solvent, obtained in any one of the above ways, the solvent is then distilled off, and in the residue the phosphatides are separated from the hormones by using a proper precepitant. Acetone is most suitable for this purpose, as by its admixture the phosphatides are precipitated, while the chief quantity of the hormones remains in the mother-liquid. The precipitated phosphatides can be purified by repeated dissolving in alcohol and precipitating with acetone. In order to isolate the hormones from the mother-liquid in acetone resulting from the precipitation of the phosphatides, the mother liquid is concentrated until it has a syrupy like consistency and is then taken up in hot water. As this liquid cools, the fats rise to the surface. The watery solution and the fats are now extracted by means of ether.

In a still simpler manner and with a better output the hormones can be obtained from the acetonic mother liquid after the precipitation of the phosphatides by purifying the residue resulting from the precipitation of the phosphatides, after its concentration by a fractional distillation in the highest vacuum possible. In this way a mixture of harmones with cholestol and cholestolester distils over as the principal fraction between 190-210°. By treating the distillate with cold alcohol, the harmones are dissolved, while some cholestol and cholestolester crystallize out and are separated by filtration from the hormones soluble in cold alcohol. To obtain the new hormones in a chemically pure state a second distillation (refractionation) can be made immediately after the evaporation of the alcohol in a high vacuum.

To facilitate the separation of the hormones from the other ingredients of the residue of the acetonic mother-liquid, it may be appropriate to apply a treatment with ethyl or methyl alcohol before the first distillation, by which a considerable portion of the cholestol and esters of cholestol—less soluble in cold alcohol or methylalcohol—is separated.

The faculty of the hormones of being absorbed by a colloidal solution of the phosphatides, may be utilized, for turning the isolated water-insoluble hormones by means of unsaturated (phosphatides) into the form of watery solutions or emulsions, so as to obtain solutions or emulsions for hypodermic injections, suitable for therapeutical purposes.

The best way for the isolation of hormones is as follows:

50 pieces of human placenta are carefully dried in a vacuum at a low temperature and then thoroughly pulverized. The result is about 5000 g. of dry substance, which in a continually working apparatus for extraction (Soxhlet) is immediately extracted with ether or a similar volatile solvent in a completely exhaustive way. After the evaporation of the solvent, the phosphatides are precipitated from the residue by adding a four fold quantity of acetone. Now the acetone-containing mother-liquid is freed from the solvent in the vacuum. The residue is then advantageously taken up in cold ethyl or methyl alcohol, whereby a great part of cholestol and esters of cholestol—less soluble in the cold solvents—are separated out. After the evaporation of the alcohol the residue is purified by a fractional distillation in the highest vacuum possible. Under a pressure of 0.06 mm. mercury a mixture of hormones with cholestol and esters of cholestol distils over as the principal fraction.

By treating this distillate with cold alcohol, the hormones are dissolved, while cholestol and saturated esters of cholestol crystallize out. For the manufacture of the substance desired in a chemically pure state a second distillation refractionation in a high vacuum can be made after the evaporation of the alcohol.

We claim:

1. The herein described physiologically active hormones, containing carbon, hydrogen, and oxygen in the following amounts:

| | |
|---|---|
| Carbon | 81.33 to 81.62% |
| Hydrogen | 11.32 to 11.49% |
| Oxygen | 6.89 to 7.35% | said compounds at ordinary room temperature being a thickly flowing oily liquid, which distils under a vacuum of 0.06 mm. of mercury at a temperature of 193° C. (uncorrected), and which bodies show cholestol reactions, said substances being isolated from the animal tissue of which they form normal constituents, such products having the property of stimulating the activity of the female reproductive organs and associated parts.

2. The herein described nitrogen-containing substances in an isolated state, which are easily soluble in ether, petroleumether and alcohol, said substances being colloidally soluble in water and sparingly soluble in acetone, said substances giving the reaction of unstaurated compounds with permanganate, and containing nitrogen and phosphorus in approximately the proportions of 5 to 2.

3. A process of producing the herein described new hormones having the property of stimulating activity of the female reproductive organs and associated parts from animal tissue, said process comprising the successive steps of dissolving from animal tissue, by means of a volatile solvent, the hormones, phosphatides, fats, cholestol and esters of cholestol, together with other materials soluble in the solvent used, thereafter separately separating the phosphatides and the hormones from the mother liquor, freeing the hormones from fats, cholestol and esters of cholestol whereby the hormones are isolated.

4. The herein described process of producing hormones having the property of stimulating activity of the female reproductive organs and associated parts from animal tissue containing the same, which process comprises the steps of extracting such tissues with a volatile solvent of the hormones, which solvent is also capable of dissolving phosphatides, fats, cholestol, and saturated esters of cholestol contained in the tissue, precipitating the phosphatides from the solution, separating the hormones from the mother liquor, freeing the hormones from animal fat, cholestol and saturated esters of cholestol, whereby the hormones are isolated.

5. The herein described process of producing hormones having the property of stimulating activity of the female reproductive organs and associated parts, which comprises boiling in acidulated water, minced tissue containing, together with other materials, hormones, phosphatides, fats, cholestol and esters of cholestol, extracting the concentrated acid-aqueous extract with volatile solvents for at least some of the substances mentioned, percipitating the phosphatides and thereafter separating material containing the hormones from the mother liquor, and finally freeing the hormones from admixed fats, cholestol and esters of cholestol.

6. The herein described process of obtaining isolated hormones having the property of stimulating activity of the female reproductive organs and associated parts, which comprises treating minced animal tissue containing, together with other materials, hormones, phosphatides, fats, cholestol and esters of cholestol, with a volatile liquor miscible with water, which is a solvent of hormones, phosphatides, fats, cholestol, and cholestol esters, to remove a large portion of the water from said tissue, again extracting the said tissue with a solvent of the kind used in said first step, combining the extracts produced and concentrating the mixture, shaking out the concentrated extract with a liquid not miscible with water, which liquid is a solvent of hormones, phosphatides, fats, cholestol and cholestol esters, precipitating the phosphatides from the solution, separating the hormones from the mother liquid and freeing the hormones from admixed fats, cholestol and cholestol esters.

7. The herein described process of obtaining hormones having the property of stimulating activity of the female reproductive organs and associated parts, which comprises drying in a vacuum, animal tissue containing together with other materials, hormones, phosphatides, fats, cholestol and cholestol esters, extracting hormones, phosphatides, fats, cholestol and cholestol esters with a volatile solvent for such materials, precipitating the phosphatides from the solution, separating the hormones from the mother liquid and freeing the hormones from admixed fats, cholestol and esters of cholestol.

8. The herein described process of isolating hormones having the property of stimulating activity of the female reproductive organs and associated parts from animal tissues containing hormones, phosphatides, fats, cholestol, esters of cholestol and other materials, which comprises drying the tissue by mixing the same with anhydrous salts capable of uniting with water, extracting the dried tissue with a volatile solvent of hormones, phosphatides, fats, cholestol and esters of cholestol, precipitating the phosphatides from the solution, precipitating the hormones from the mother liquid, and freeing the precipitate containing hormones from substantially its entire content of fats, cholestol and esters of cholestol.

9. The herein described process of obtaining hormones having the property of stimulating activity of the female reproductive organs and associated parts, which comprises extracting dried animal tissue containing hormones, phosphatides, fats, cholestol, esters of cholestol and tissue material, with water-dissolving volatile solvents, concentrating the solution, extracting the residue with a liquid not miscible with water, which liquid is a solvent of hormones, phosphatides and cholestol derivatives, precipitating the phosphatides from the second extract, separating from the mother liquid a material containing at least the major part of the hormones, freeing said material from cholestol derivatives, whereby the hormones are islolated.

10. The herein described process of obtaining hormones having the property of stimulating activity of the female reproductive organs and associated parts from dehydrated animal tissues containing hormones, fats, phosphatides, cholestol and cholestol esters, which process comprises extracting such tissue with a volatile solvent of hormones, phosphatides, fats, cholestol and esters of cholestol, precipitating the phosphatides from the solution by acetone, separating solid material containing the hormones from the acetonic mother liquid, freeing the hormones from admixed fats, cholestol and cholestol esters.

11. The herein described process of obtaining hormones having the property of stimulating activity of the female reproductive organs and associated parts from dehydrated animal tissues containing hormones, fats, phosphatides, cholestol and cholestol esters, which process comprises extracting such tissue with a volatile solvent of hormones, phosphatides, fats, cholestol and esters of cholestol, precipitating the phosphatides from the solution by acetone, separating solid material containing the hormones from the acetonic mother liquid, freeing the hormones from admixed fats, cholestol and cholestol esters, by distillation in a vacuum.

12. The herein described process of isolating hormones having the property of stimulating activity of the female reproductive organs and associated parts from dried animal tissue containing hormones, phosphatides, fats, cholestol and cholestol esters and other material, which comprises extracting such tissue with ether, distilling off the principal portion of the ether, precipitating phosphatides from the residual liquid by the addition of acetone, extracting hormones from the concentrated mother liquid by treating with cold alcohol.

13. The herein described process of isolating hormones having the property of stimulating activity of the female reproductive organs and associated parts from dried animal tissue containing hormones, phosphatides, fats, cholestol and cholestol esters and other material, which comprises extracting such tissue with ether, distilling off the principal portion of the ether, precipitating phosphatides from the residual liquid by the addition of acetone, extracting hormones from the concentrated mother liquid by treating with cold alcohol, and thereafter distilling the concentrated alcoholic extract in a high vacuum to purify the hormones.

14. The herein described process of isolating hormones having the property of stimulating activity of the female reproductive organs and associated parts from dried animal tissue containing hormones, phosphatides, fats, cholestol and cholestol esters and other material, which comprises extracting such tissue with ether, distilling off the principal portion of the ether, precipitating phosphatides from the residual liquid by the addition of acetone, extracting hormones from the concentrated mother liquid by treating with cold alcohol, thereafter distilling the concentrated alcoholic extract in a high vacuum to purify the hormones, redissolving the fraction containing hormones, in cold alcohol, filtering, and again distilling the extract in a high vacuum.

15. In the herein described process of producing aqueous liquids containing hormones, the improvement which comprises dissolving the hormones in an aqueous vehicle containing pentaminodiphosphatides.

16. The herein described process of producing hormones having the property of stimulating activity of the female reproductive organs and associated parts which comprises the step of extracting the animal tissues containing the same and phosphatides, with a solvent for both hormones and phosphatides, and separately separating the phosphatides and hormones from the extract.

17. The herein described process of isolating hormones having the property of stimulating activity of the female reproductive organs and associated parts from dried placenta, ovaries, corpus luteum and other reproductive gland tissue, which comprises extracting such tissue with ether, evaporating off most of the ether, adding, for each volume, of the remaining liquid, about four volumes of acetone, to precipitate the phosphatides, distilling the acetone from the resulting liquor under pressure below atmospheric, to leave a residue containing the hormones and other ingredients, taking up this residue with alcohol, whereby a portion of the cholestol and cholestol ethers separate, evaporating the alcohol from the resulting liquid, separating the hormones from the bulk of the other materials by fractional distillation in vacuum.

18. The herein described process of isolating hormones having the property of stimulating activity of the female reproductive organs and associated parts from dried placenta, ovaries, corpus luteum and other reproductive gland tissue, which comprises extracting such tissue with ether, evaporating off most of the ether, adding, for each volume of the remaining liquid, about four volumes of acetone, to precipitate the phosphatides, distilling the acetone from the resulting liquor under pressure below atmospheric, to leave a residue containing the hormones and other ingredients, taking up this residue with alcohol, whereby a portion of the cholestol and cholestol ethers separate, evaporating the alcohol from the resulting liquid, separating the hormones from the bulk of the other materials by fractional distillation in vacuum, redissolving in alcohol that fraction of the distillate which contains the bulk of the hormones, whereby the remaining part of the cholestol and cholestol esters are left undissolved, distilling off the alcohol, and fractionally redistilling in vacuum, and separately collecting the fraction consisting of the hormones in a substantially pure state.

19. The herein described new hormones, isolated from placenta, ovaries, corpus luteum and other reproductive gland tissue, said hormones being an oily liquid material, not readily soluble in water, but soluble in ether, petroleum ether, alcohol and acetone, said hormones distilling in a vacuum of .06 mm. of mercury at about 193° C., such products having the property of stimulating the activity of the female reproductive organs and associated parts.

20. The herein described new hormones isolated from placenta, ovaries, corpus luteum, and other reproductive gland tissue, said hormones being oily liquids and having the following physiological effects: (a) promotion of the growth of the uterus, ovaries, oviducts and vagina, (b) an increase of secretion of the mammary glands, (c) premature sexual maturity in half-grown animals, with simultaneous hindrance of the development of other normal faculties, and (d) rutting symptoms.

21. The herein described new hormones isolated from placenta, ovaries, corpus luteum and other reproductive gland tissue, said hormones being oily liquids and being capable of producing increased activity of the sexual organs.

SIGMUND FRAENKEL.
EDMUND HERRMANN.

Witnesses:
CARL GRUBLEN,
AUGUST FUGGER.